United States Patent [19]
Gandhi et al.

[11] 3,880,775

[45] Apr. 29, 1975

[54] PROCESS FOR PREPARING A RUTHENIUM CATALYST

[75] Inventors: Haren S. Gandhi, Dearborn; Joseph T. Kummer, Ann Arbor; Mordecai Shelef, Southfield, all of Mich.

[73] Assignee: Ford Motor Company, Dearborn, Mich.

[22] Filed: Nov. 29, 1973

[21] Appl. No.: 420,023

Related U.S. Application Data

[63] Continuation of Ser. No. 318,338, Dec. 26, 1972, Pat. No. 3,835,069.

[52] U.S. Cl.............. 252/462; 252/455 R; 252/463; 252/466 PT; 252/475; 252/477 R; 423/212
[51] Int. Cl.............................................. B01j 11/08
[58] Field of Search...... 252/466 PT, 462, 463, 455, 252/477 R, 475; 423/212

[56] References Cited
UNITED STATES PATENTS

| | | | |
|---|---|---|---|
| 2,580,806 | 1/1952 | Malina | 212/475 |
| 3,498,927 | 3/1970 | Stiles | 252/463 |
| 3,513,109 | 5/1970 | Stiles | 252/462 |
| 3,554,929 | 1/1971 | Aarons | 252/462 |
| 3,565,830 | 2/1971 | Keith et al. | 423/212 |
| 3,670,042 | 6/1972 | Croce et al. | 252/462 |
| 3,696,167 | 10/1972 | Juguin et al. | 252/466 PT |
| 3,702,875 | 11/1972 | Manning et al. | 252/462 |

OTHER PUBLICATIONS

Donohue et al. Inorg. Chem., 4 (1965) p. 306

*Primary Examiner*—Arthur P. Demers
*Attorney, Agent, or Firm*—Keith L. Zerschling; William E. Johnson

[57] ABSTRACT

A process is taught for producing a ruthenium catalyst. A ruthenate is presynthesized, ground into a fine powder, dispersed in a gamma alumina containing medium and applied as a slurry to a catalytic support. The ruthenate slurry is dried on the support and calcined. The product produced in this manner is desirable for use in the catalytic conversion in a reducing atmosphere of oxides of nitrogen. The ruthenium catalyst of the product produced by this method is resistant to volitalization when exposed to an oxidizing ambient.

7 Claims, No Drawings

PROCESS FOR PREPARING A RUTHENIUM CATALYST

This is a continuation of application Ser. No. 318,338, filed Dec. 26, 1972, now U.S. Pat. No. 3,835,069.

BACKGROUND OF THE INVENTION

U.S. patent application, Ser. No. 174,594, filed Aug. 25, 1971, now abandoned, and assigned to the same assignee as the present application, hereby incorporated by reference, teaches the use of ruthenium as a catalyst for converting oxides of nitrogen in combustion products of an engine into other compounds. In general, this same application teaches that ruthenium, in a reducing atmosphere, is effective to catalyze the reaction of oxides of nitrogen into other compounds without the formation of ammonia.

In working with such a ruthenium catalyst, it has been discovered that if such catalyst is exposed to an oxidizing ambient, any ruthenium metal contained therein will volatilize. Such oxidizing conditions are unavoidable in the operation of an engine as an oxidizing condition will generally occur upon a cold start of that engine or during some other modes of driving. Thus a ruthenium metal catalyst will slowly volatilize over the use of the engine and the conversion efficiency of a catalyst system based on pure, unprotected, ruthenium metal will decrease.

In view of such a decrease of efficiency, it is desirable to fix somehow the ruthenium in such a catalyst system in a manner that it will not volatilize when exposed to an oxidizing ambient. It is desirable to fix the ruthenium in such a fashion that its exposure to an oxidizing ambient will not adversely affect its ability to convert subsequently any undesirable nitrogen compounds found in an exhaust gas having reducing characteristics.

SUMMARY OF THE INVENTION

This invention relates to a method of forming a ruthenium containing catalyst and the product produced thereby and, more particularly, to such a method in which the ruthenium is fixed in the catalytic system in such a manner that its effectiveness is not destroyed or reduced by exposure of the system to an oxidizing ambient.

In its broadest application, the method of this invention is carried out by reacting initially ruthenium with a compound selected from the group consisting of alkaline earth materials, rare earth materials or mixtures of rare earth materials which are cheaper than individual rare earth materials to presynthesize a ruthenate. The ruthenate is processed to a finely divided powder and is then slurried with a gamma alumina containing material. The ruthenate slurry is applied to a catalytic support and dried thereupon. The ruthenate on the catalytic support is calcined to set the ruthenate on the support.

In still greater detail, the material with which the ruthenium is reacted to presynthesize a ruthenate is an oxide. Also, the ruthenate is deposited on the catalytic support so that ruthenium will be contained thereon in a concentration of from at least 100 parts per million (ppm) to 20,000 ppm.

The product produced by this method is a ruthenium catalyst system in which ruthenium is effective for catalyzing the reduction of nitrogen oxide compounds to other compounds without any substantial formation of ammonia. The catalyst system is also one which does not volatilize or have its efficiency decreased substantially after system has been exposed to an oxidizing ambient.

The presynthesized ruthenate can be deposited on any type of a catalytic support known in the art. The catalytic support may be pretreated with a selected material in order to increase its effective surface area prior to the deposition of the ruthenate slurry thereon.

DESCRIPTION OF THE PREFERRED EMBODIMENT

The method of this invention, in a preferred embodiment, is initiated by preparing a ruthenate. A procedure for preparing a ruthenate is described in *Inorganic Chemistry* 4, (3) page 306–310 (1965), by P. C. Bonohue et al. In synthesizing a ruthenate in this preferred embodiment, barium peroxide and ruthenium powder are reacted in air at 1000°C according to the following equation: $BaO_2 + Ru + \frac{1}{2} O_2 \xrightarrow{1000°} BaRuO_3$.

While barium oxide is described in this preferred embodiment as reacting with ruthenium, other materials which may be reacted with ruthenium to form a ruthenate include alkaline earth metal oxides of strontium, calcium, magnesium, and beryllium. Also oxides of rare earth materials such as lanthanum, cerium, praseodymium, samarium, etc., or commerically available and relatively cheap mixed rare-earth oxides can be used in the formation of the ruthenate in accordance with the procedure discussed above.

The surface area measured by nitrogen adsorption at liquid nitrogen temperature of the ruthenate produced as above described is less than 1 square meter per gram. The synthesized barium ruthenate is ground in a ball mill for a suitable period of time, e.g., at least 10 minutes, to reduce the size of the material. A fraction of the ground material which passes through a number 325 sieve (44 microns) is separated for further processing. While the exact size material used for further processing is not critical, the finer the material that is used for further processing, the better will be the dispersion of the ruthenate compound on the catalytic support which is to be used in the system.

The prior art has taught many different catalytic supports. For example, catalytic supports may be formed in accordance with the teachings of Johnson et al, U.S. Pat. No. 3,444,925. Also, extruded catalytic supports may be used as well as any of the other supports known in the art. In some cases it is desirable to increase the surface area of the catalytic support used in the catalyst system.

In order to illustrate the preferred embodiment of the method of this invention, a 2 and 21/32 inch diameter by 3 inch long monolithic catalytic support is coated with a slurry containing 15 percent by weight of "Dispal -M", a gamma alumina sold by Continental Oil Company. The catalytic support is coated with this material until it has about 10 percent by weight of gamma alumina thereon. The support is dried at 120°C and calcined at 600°C for 6 hours. The calcining temperature and length of calcining may be adjusted to other schedules in accordance with those known in the art. For example, the calcining temperature may be varied between 300°C and 800°C for 2 hours to 20 hours. The surface area of the support after such a coating is about 14 meters square per gram.

A slurry of the barium ruthenate powder prepared as above described is formed by mixing 2 percent by weight of a gamma alumina material with the finely ground ruthenate powder. In this case, the slurry contains 2 percent by weight of the gamma alumina material but it may contain from 0.5 to 20 percent of this material if so desired. The slurry is deposited on the prepared catalytic support. A sufficient amount of the slurry is deposited on the support so that the ruthenium metal concentration of the barium ruthenate is about 2,000 ppm. The amount of ruthenium metal deposited can vary from 100 ppm to 20,000 ppm depending upon the end use or application. The material deposited on the catalytic support is dried in air at 120°C. Other drying schedules within the knowledge of those skilled in the art may be used to effect the drying.

After the slurry containing the ruthenate has been deposited and dried on the catalytic support, the support is calcined at 600°C for 6 hours to set the ruthenate on the support. By setting the ruthenate, we mean to make it adhere to the support. Once again, the calcining of the support can be accomplished at other temperatures and for other time lengths. Such firing schedules are well within the realm of those skilled in the art. For example, the firing schedule may vary from 300°C to 800°C and from 2 hours to 20 hours.

A catalytic system prepared in the above manner has been tested on an engine dynamometer and it gave 95 percent $NO_x$ conversion efficiency. The efficiency was developed when the catalyst was treating a reducing exhaust gas containing oxides of nitrogen for the first 100 hours of treatment. This same catalyst system was subjected to an exhaust gas containing about 5 percent oxygen at outlet gas phase temperatures up to 1000°C or more for 12 hours. After this severe treatment the $NO_x$ conversion efficiency when treating a reducing as containing oxides of nitrogen dropped only from 95 to 80 percent. The efficiency remained at 80 percent after the catalyst system had been tested for another 250 hours.

As an explanation of the theory by which the catalyst system of this invention is operative, certain tests were carried out on the materials employed herein and the following was discovered. Thermo-gravimetric analysis show that ruthenates, for example barium ruthenate, are stable towards volatilization under oxidizing conditions up to 1100°C whereas ruthenium oxide powder starts to volatilize at a slow rate even at temperatures as low as 400° to 500°C and at very fast rate when held at 1100°C under oxidizing conditions. When only ruthenium oxide is employed in an oxidizing ambient, it takes only about 3 hours to lose 30 percent of the compound due to volatilization compared with no loss at all in the case of a ruthenate such as barium on the material deposited on a catalytic support.

Further thermo-gravimetric studies on barium ruthenate showed that barium ruthenate, when subjected to a stream of 6.5 percent CO and the balance of nitrogen, loses weight at 450°C. The sample was held at 1200°C for an hour until it reached a steady state weight. A portion of the sample was analyzed by x-ray diffraction and was found to contain barium oxide and ruthenium metal. The sample was then subjected to a stream of air at 1200°C whereby it regained some weight. The sample was analyzed by x-ray diffraction and it was found to be pure barium ruthenate. This testing was repeated on another sample of barium ruthenate which was subjected to the reduction and oxidation cycle at 1200°C. Each time after oxidation, the sample came back to the exact initial weight. At the end of the sixth cycle, the sample was analyzed by x-ray diffraction techniques and was identified as pure barium ruthenate. Similar thermo-gravimetric experiments were done on pure lanthanum ruthenate which also was found to behave in a similar fashion. Lanthanum ruthenate reduces under reducing conditions to lanthanum oxide and ruthenium and under oxidizing conditions is oxidized back to lanthanum ruthenate.

The explanation, therefore, of the mechanism of the ruthenium catalyst system disclosed herein is believed to be as follows. Under the reducing conditions wherein the ruthenium is employed to reduce undesirable nitrogen compounds, the active catalytic material on the catalyst substrate is finely divided ruthenium. The ruthenium in its finely divided state is closely associated with an adjacent zone of the stabilizing alkaline earth oxide or rare-earth oxide. Thus during active catalytic operation, ruthenium is the catalyst. However, when oxidizing conditions exist and the ruthenium is subjected to an oxidizing ambient, the ruthenium metal reunites with the stabilizing alkaline earth oxide or rare-earth oxide to form a stable ruthenate. The ruthenate composition does not volatilize. When the catalyst is once again subjected to a reducing condition, the ruthenate compound once again reforms ruthenium and the stabilizing oxide.

In view of this disclosure, many modifications of this invention will be apparent to those skilled in the art. It is intended that all such modifications which fall within the true scope of this invention be included within the terms of the appended claims.

What is claimed is:

1. A method of forming a ruthenium containing catalyst system in which the activity of the catalytic material of the system is not destroyed or severely reduced when the system is exposed to oxidizing conditions of either a prolonged or a sporadic nature, which method comprises the steps of:

reacting ruthenium with a compound selected from the group consisting of alkaline-earth materials, rare earth materials or mixed rare earth materials to form a ruthenate compound;

forming said ruthenate compound into a finely divided powder;

forming a slurry of said finely divided powder and a gamma alumina containing substance;

depositing said slurry on a suitable catalytic support;

drying said support with said slurry thereon; and calcining said dry support to set said materials of said slurry remaining on said support after said drying step thereby to produce said catalyst system.

2. The method of claim 1 wherein: said compound selected to react with said ruthenium is an oxide of the material.

3. The method of claim 1 further including the step of:

depositing a gamma alumina containing material on said catalytic support;

drying said catalytic support; and calcining said support all prior the deposition of said slurry on said cataltic support.

4. A method of forming a ruthenium containing catalyst system in which the catalytic activity of the ruthenium is neither destroyed nor severely reduced when the system is exposed to oxidizing conditions, which method comprises the steps of:

reacting finely divided ruthenium with a compound selected from the group consisting of alkaline-earth oxides, rare earth oxides or mixed rare earth oxides to form a ruthenate compound;

grinding said ruthenate compound to form a finely divided powder;

forming a slurry of said finely divided powder with 0.5 to 20 percent by weight of a gamma alumina containing substance;

depositing said slurry on a suitable catalytic support until the ruthenium content of said ruthenate is present in a concentration of from 100 ppm to 20,000 ppm;

drying said support with said slurry thereon at a moderate temperature;

calcining said support at a temperature in the range of 300°C to 800°C for a period of 2 to 20 hours to set said materials of said slurry remaining on said support after said drying step thereby to produce said catalyst system.

5. The method of claim 4 further including the step of:

depositing a gamma alumina containing material on said catalytic support;

drying said support; and calcining said catalytic support all prior to the deposition of said slurry on said catalytic support.

6. The method of claim 4 wherein: finely divided powder having a particle size less than 44 microns (325 sieve) is selected after the grinding step for forming said slurry.

7. The method of claim 4 wherein: said drying step is carried out at a temperature less than 300°C.

* * * * *